Dec. 16, 1952        G. G. McNAMARA, JR        2,621,817
TRACTOR-MOUNTED POWER LOADER
Filed Aug. 27, 1948        6 Sheets-Sheet 1
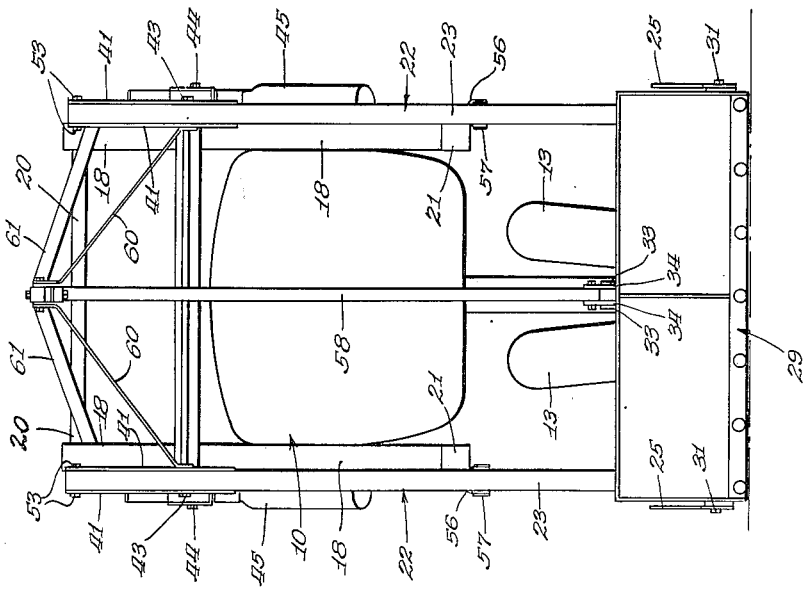
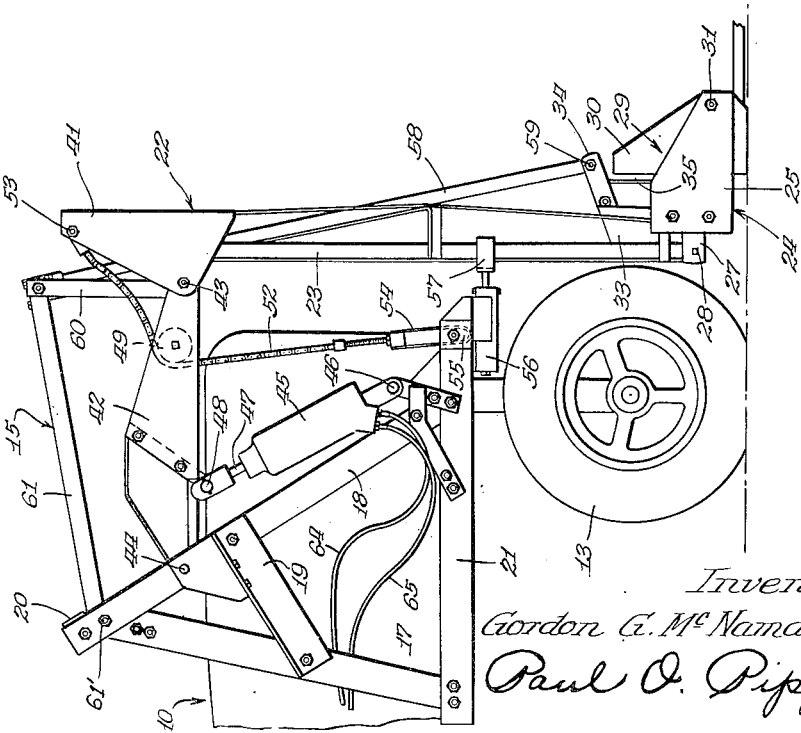
Inventor
Gordon G. McNamara, Jr.
Paul O. Pippel
Atty.

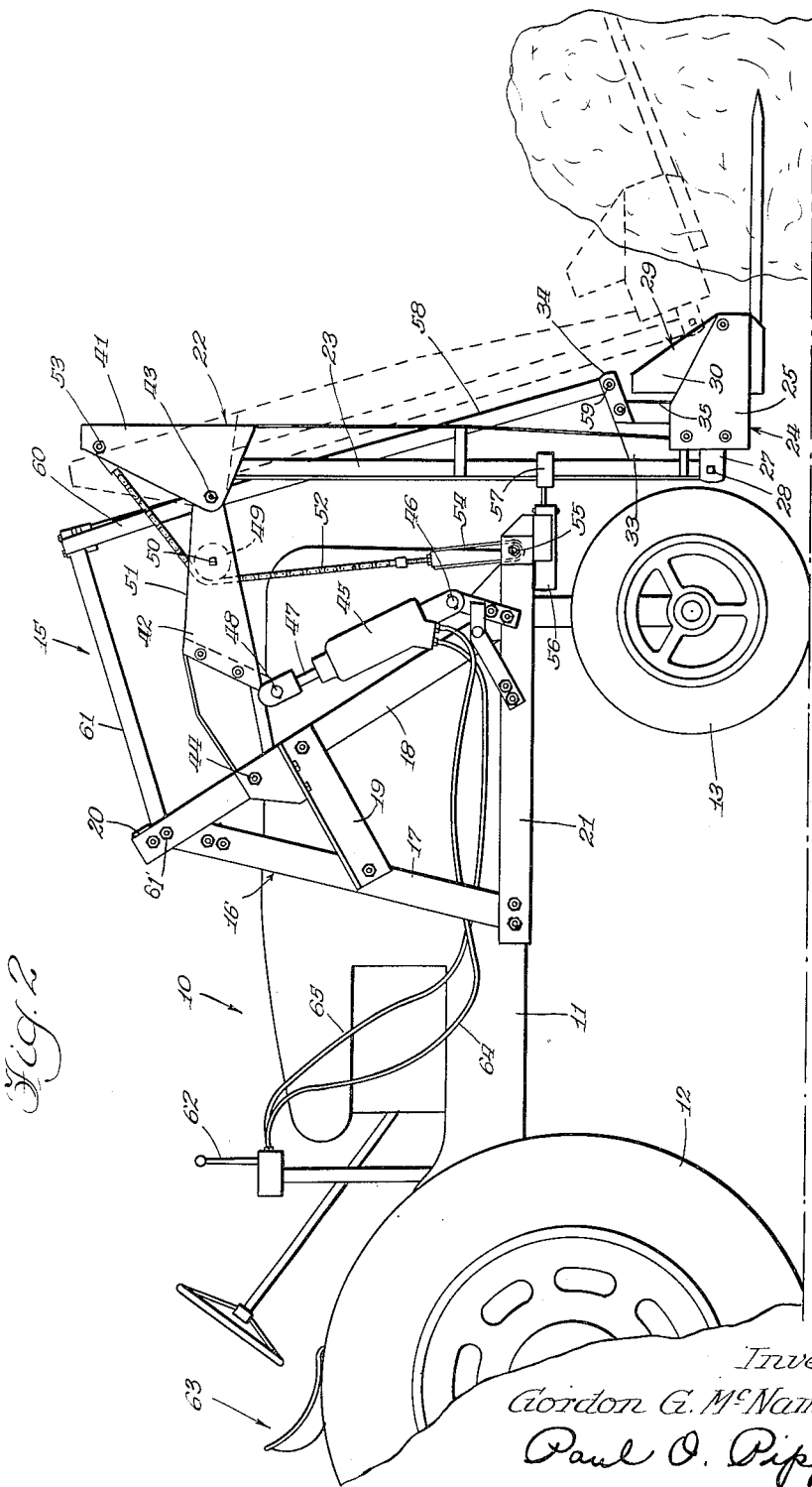

Dec. 16, 1952     G. G. McNAMARA, JR     2,621,817
TRACTOR-MOUNTED POWER LOADER
Filed Aug. 27, 1948     6 Sheets—Sheet 3
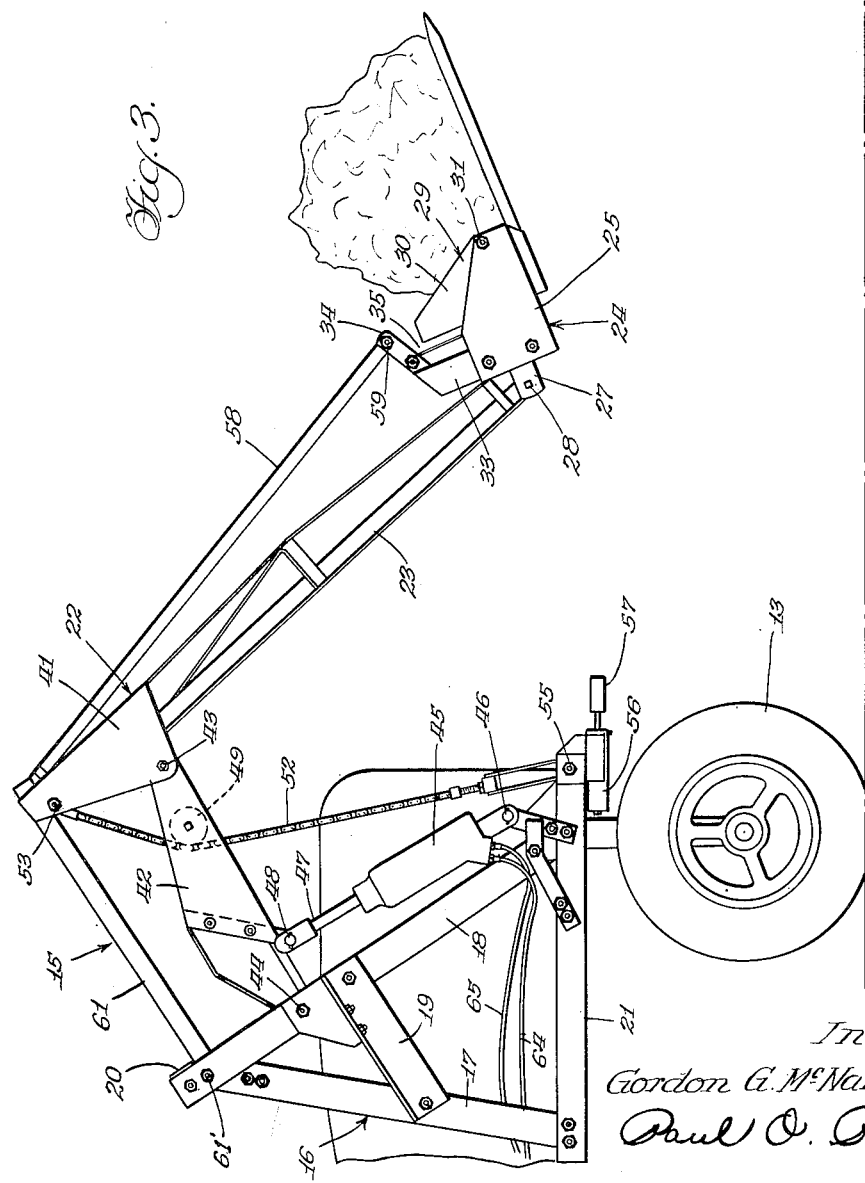
Inventor
Gordon G. McNamara, Jr.
Paul O. Pippel
Atty.

Dec. 16, 1952   G. G. McNAMARA, JR   2,621,817
TRACTOR-MOUNTED POWER LOADER
Filed Aug. 27, 1948   6 Sheets-Sheet 4
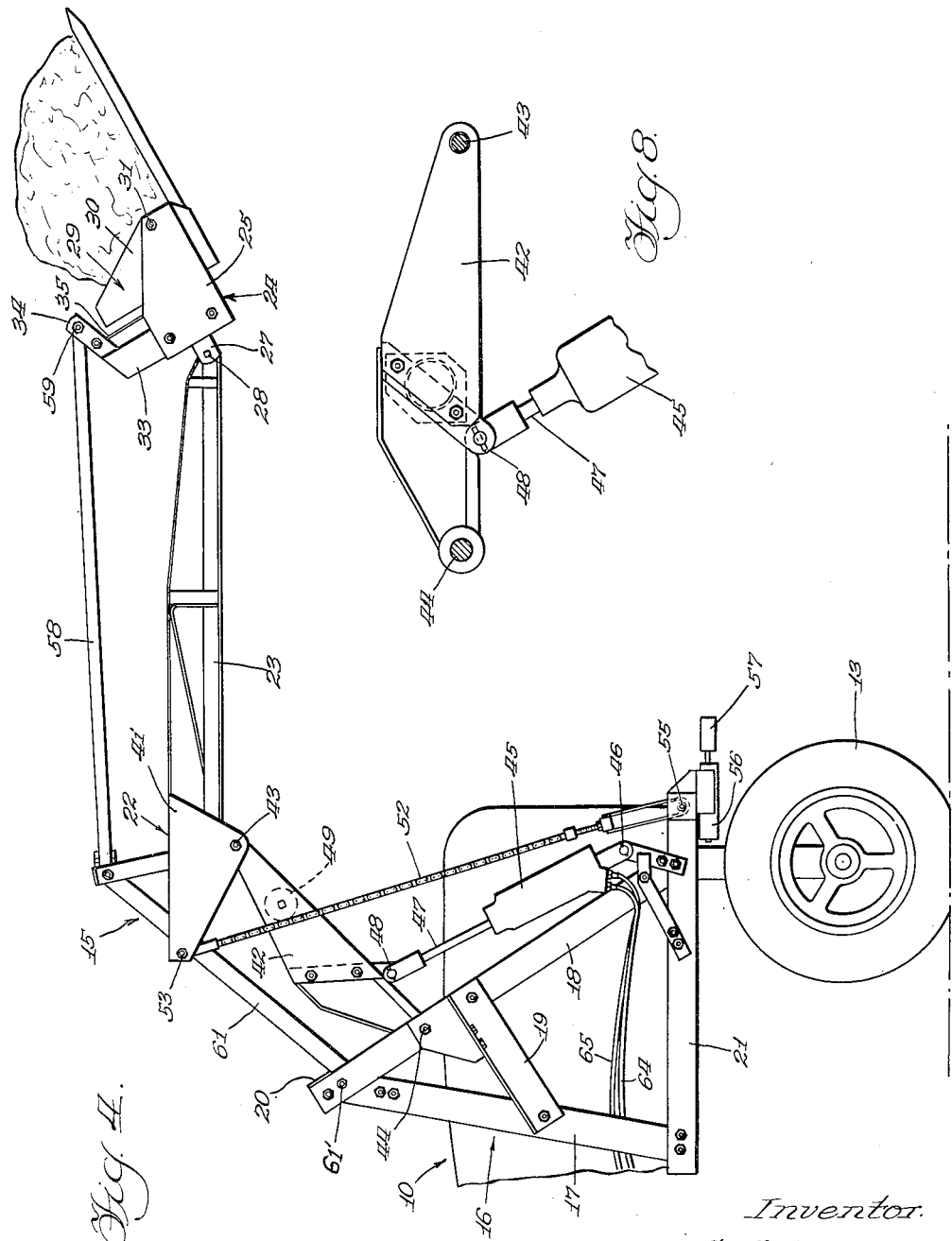
Inventor.
Gordon G. M<sup>c</sup>Namara, Jr.
Paul O. Pippel
Atty.

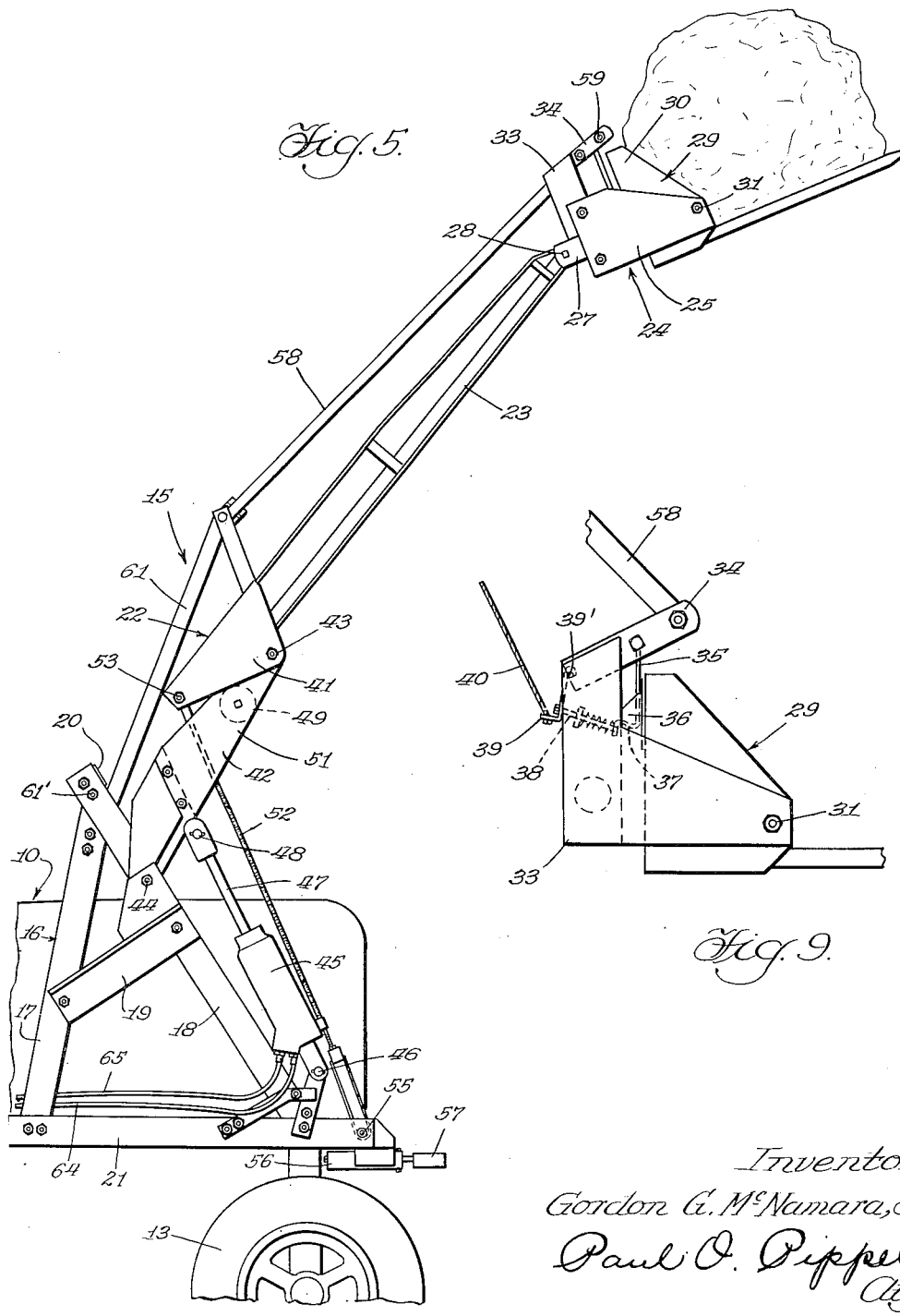

Dec. 16, 1952      G. G. McNAMARA, JR      2,621,817
TRACTOR-MOUNTED POWER LOADER
Filed Aug. 27, 1948      6 Sheets-Sheet 6
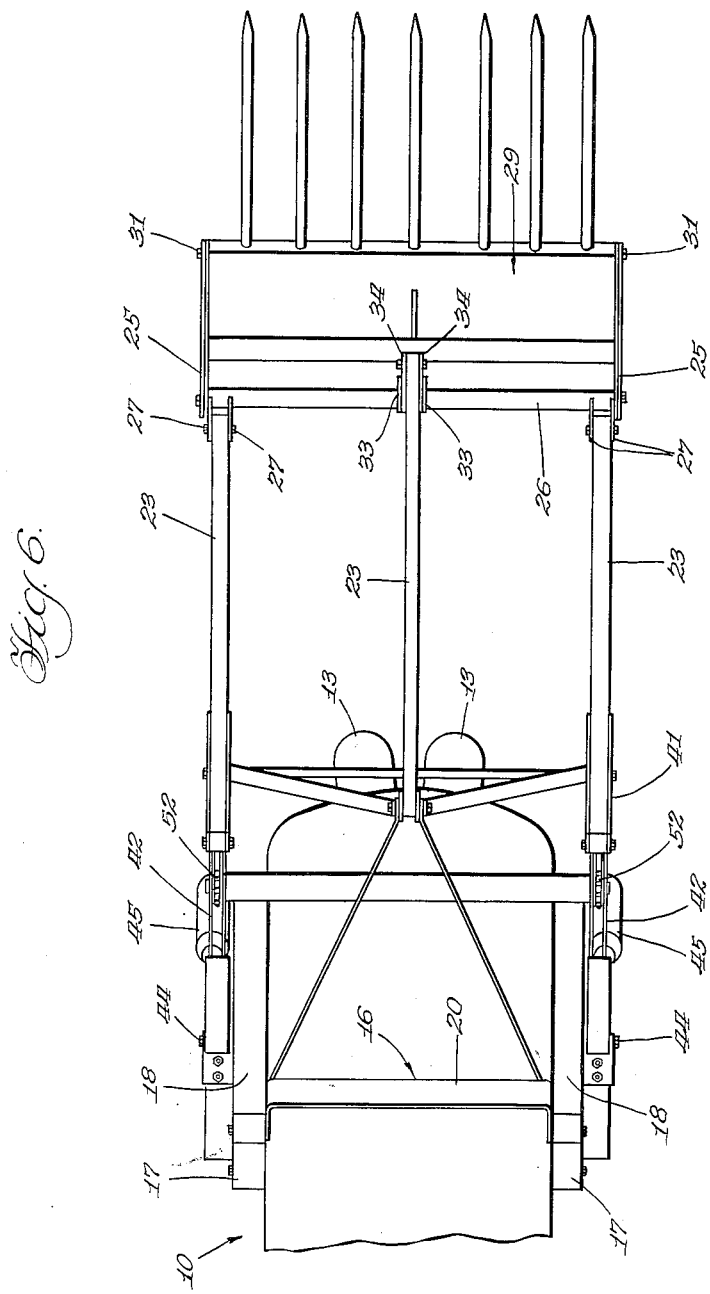
Inventor.
Gordon G. McNamara, Jr.
Paul O. Pippel
Atty.

Patented Dec. 16, 1952

2,621,817

UNITED STATES PATENT OFFICE 2,621,817

TRACTOR-MOUNTED POWER LOADER

Gordon G. McNamara, Jr., Chicago, Ill., assignor to International Harvester Company, a corporation of New Jersey Application August 27, 1948, Serial No. 46,432

5 Claims. (Cl. 214—140)

This invention relates to an improved power loader of a type connected to the front end of a tractor.

Power loaders of the type generally used in connection with farm operations have been of a boom type construction. In boom type loaders a pair of longitudinally extending frame members are pivoted on the tractor and extend longitudinally forwardly of the tractor. A shovel or fork is connected to the longitudinally extending frame members and a hydraulic ram is usually attached to the frame for raising and lowering the shovel. Loader attachments of this kind have been quite generally used in the loading of manure, grain, and other farm materials. The disadvantages of this type of loader are generally recognized by farm operators and can quickly be enumerated. The overhanging construction of the boom type loader generally places a magnified factor of the work being done and higher stresses directly on the front wheels of the tractor to which the loader is attached. The overhanging longitudinal frame members provide a cantilever action and the initial lifting forces are thus carried on to the tractor in a magnitude much greater than the actual force being exerted against the material. It is well known that the greatest lifting stresses take place during the initial load engaging operation of the shovel. The load may be frozen, tightly compacted, and the initial force required to break loose a shovel full of material from the load causes the greatest stresses during the operation. The disadvantage of a boom type loader in this respect is thus clearly apparent.

Another common fault of this type of loader lies in the height limitation. With a construction utilizing the longitudinally extending frame structure the height of operation is quite limited since the length of the hydraulic power unit and the variations of linkages utilized are limited. The weight of a boom type loader is generally excessive and thus additional, undesirable stresses are placed on the tractor. When the boom type loader engages the pile the cantilever action is such that the rear wheels have a tendency to lose traction thus the traction on the rear wheels is often insufficient to remove the shovel from the proximity of the pile with the load fully intact. During the operation of this type of loader the shovel is generally shoved into the load to be engaged by the forward traction of the tractor. When the shovel has fully penetrated it is a general practice to move the tractor rearwardly and simultaneously operate to lift the shovel vertically. In this manner it is hoped that a fully loaded shovel may be extricated from the pile. This is very seldom the case since the shovel enters the pile in a substantially horizontal position, and upon rearward movement of the tractor, leaves the pile in a similar position without effectively hooking any of the material which is intended to be loaded. It is a prime object of this invention, therefore, to provide an improved power loader that is constructed so that a fully loaded shovel may be extricated from a material pile with a minimum effort by the operator and the loader.

Another object is to provide a loader attachment for a tractor, said loader attachment including a novel linkage mechanism whereby the loader shovel engages the pile in a substantially horizontal position and whereupon rearward movement of the tractor for extricating the shovel, said shovel is sharply tilted upwardly within the pile, thereupon hooking a portion of the pile and thus leaving said pile substantially fully loaded.

Still another object is to provide an improved power loader construction, said construction including a lifting frame that is bodily movable vertically close to the front wheels of the tractor, said lifting frame being adapted to be swung forwardly in an arcuate path with the toe of the shovel or fork tilted upwardly angularly, thereby providing an effective load engaging characteristic of the shovel.

A further object is to provide a power loader, said loader including a vertically extending frame positioned forwardly of the tractor and a longitudinally extending lifting arm pivotally connected to the tractor and to the frame, said frame being movable vertically during the initial load engaging position and subsequently being adapted to be swung in an arcuate path to a lifted position with the fork or shovel maintaining a tilted position during the upwardly swinging movement of the frame.

Still another object is to provide a power loader for a tractor, said loader including a lifting frame having a vertically extending member pivotally connected to a fork or shovel, said lifting member also being pivotally connected to the tractor by means of a longitudinally extending lifting arm, and a vertically extending link pivotally connected to the shovel and extending vertically in non-parallel or diagonal relationship with respect to the vertical member for pivotal connection to the tractor.

These and other objects will become more clearly apparent upon a reading of the description when examined in connection with the accompanying drawings.

In the drawings:

Fig. 1 is a side elevational view of a tractor showing the improved loading attachment therefor, said view showing a lifting frame and shovel in a load engaging position.

Fig. 2 is a side elevational view of the loading attachment similar to Fig. 1 showing a lifting fork engaging a pile in a second stage of operation.

Fig. 3 is a side elevational view similar to Figs. 1 and 2 showing a loader having its shovel or scoop removed from the pile.

Fig. 4 is a side elevational view similar to Fig. 3 showing the loader shovel raised to a lifted position.

Fig. 5 is a side elevational view similar to Fig. 4 showing a loader shovel lifted to a maximum lift position just prior to dumping of the same.

Fig. 6 is a plan view of the loading attachment in the position shown in Fig. 3.

Fig. 7 is a front view of the loading attachment positioned as shown in Fig. 1.

Fig. 8 is a detail view of a lifting arm of a loading attachment.

Fig. 9 is a fragmentary side elevational view of a portion of a loader shovel and the latch mechanism therefor.

Referring particularly to Figs. 1, 2, 6, and 7, a tractor is generally designated by the reference character 10. The tractor 10 includes a longitudinally extending body portion 11 which is mounted on rear ground wheels 12 and front ground wheels 13.

A loader attachment generally designated by the reference character 15 is mounted on the front end of the tractor 10. The loader attachment 15 includes a supporting structure 16. The supporting structure 16 comprises a pair of upwardly extending diagonal members 17, one of which is mounted at each side of the tractor. The upwardly extending diagonal members 17 are connected by means of diagonal members 18, thus providing a rigid triangular frame structure. The diagonal members 17 and 18 are securely connected by means of a bracket 19. A member 20 extends transversely above the tractor for connecting together the upwardly extending diagonal members 17 and 18. The lower ends of the diagonal members 17 and 18 are securely connected to the tractor by means of longitudinally extending side members 21.

A lifting frame is positioned forwardly of the tractor and this frame is designated by the reference character 22. The lifting frame 22 includes a pair of transversely spaced vertical members 23. The vertical members 23 are connected at their lower ends to a shovel support 24. The shovel support 24 comprises a pair of transversely spaced vertical end plates 25 which are interconnected by means of a transversely extending torque tube 26. The torque tube 26 is provided at each end with rearwardly extending straps 27 to which the lower ends of the vertical members 23 are connected by means of pins 28.

A load engaging member in the form of a scoop, shovel, or fork 29 is positioned between the vertical members 23 for rotation about a transverse axis with respect thereto. The shovel 29 includes a heel portion 30 which is pivotally connected as indicated at 31 to the vertical members 23. The shovel also includes a toe or load engaging edge portion 32. Spaced intermediate the ends of the torque tube 26 are a pair of upwardly extending plates 33. The upwardly extending plates 33 have rigidly connected thereto forwardly extending brackets 34. A latch 35 is pivotally connected between the forwardly extending brackets 34 and depends downwardly therefrom. The latch 35 is adapted to engage a catch or angle member 36 rigidly secured to the heel portion 30 of the shovel 29. The lower end of the latch 35 is provided with an L-shaped portion 37. The L-shaped portion 37, as best shown in Fig. 9, has connected thereto a pin 38 which extends rearwardly for connection to a pivoted member 39. The pivoted member 39 is pivoted between the forwardly extending brackets 34 as indicated at 39'. A rope or flexible member 40 is connected to the pivoted member 39 for releasing the latch 35 from the angle 36.

The upper ends of the vertical members 23 are provided with spaced plate members 41. The plate members 41 are pivotally connected to a longitudinally extending lifting arm 42. Each vertical member 23 is connected to a lifting arm 42 extending longitudinally for connection with the supporting structure 16. A lifting arm 42 is thus positioned in spaced relation at each side of the tractor, each lifting arm being pivotally connected to the plate members 41 by means of a pivotal connection 43. Each lifting arm 42 is connected at its rear by means of a pivotal connection 44 to the supporting structure 16.

A hydraulic cylinder 45 is positioned at each side of the tractor 10. Each hydraulic cylinder is pivotally connected at its lower end as indicated at 46. Each cylinder is provided with a piston rod 47 which is connected at its upper end as indicated at 48 to the lifting arm 42. A sprocket or sheave 49 is journaled on each lifting arm 42 by means of a shaft 50 which extends through laterally spaced side plates 51 of the lifting arm 42. Transversely spaced chains 52 extend over the sprockets 49, the upper end of said chains being connected to the upper ends of the plate members 41 as indicated at 53. The lower ends of the chains 52 are provided with U-shaped members 54. A bolt 55 is rigidly connected to each longitudinal member 21, each bolt extending through each U-shaped member 54. In the position shown in Fig. 2, the U-shaped member 54 has engaged the bolt 55 in tensioned relation. As shown in Fig. 1, when the lifting frame is positioned in its lowermost position, the chain 52 is slackened and the U-shaped member 54 may slide relatively upwardly or downwardly with respect to the pin 55.

As shown in Figs. 1 and 2, the vertical members 23 of the frame 22 are engaged and held against rearward movement by transversely positioned bumpers 56 rigidly secured to the front end of the tractor. The bumpers 56 are provided with guides 57 which are engaged by the vertical members 23 in sliding relation.

A link 58, as best shown in Figs. 1, 2, 6, and 7, is pivotally connected as indicated at 59 to the forwardly extending bracket 34 of the shovel support 24. The link 58 is, as shown in Figs. 1 and 2, in non-parallel or diagonal relation with respect to the vertical members 23. The link 58 extends forwardly and rearwardly in diagonal relation and is connected to a pair of spaced straps 60 which are pivotally connected as indicated at 43 to the vertical members 23 and the lifting arms 42. The link 58 is also pivotally connected to a pair of straps 61 which extend rearwardly for pivotal connection to the frame 16 as indicated at 61'.

In the operation of the loader 15, the operator actuates a valve lever 62 adjacent an operator's station 63. The valve lever 62 is provided for controlling the flow of liquid from a fluid pump (not shown) through conduits 64 and 65. During the initial operation of the tractor the operator may position the fork 29 in or between the positions shown in Figs. 1 or 2. Supposing that the shovel is positioned as indicated in Fig. 1. The operator thereupon drives the tractor forwardly and the momentum of the tractor pushes the shovel into the pile as indicated in Fig. 1. After the shovel has penetrated to its full depth, the operator then desires to break a certain amount of the load loose from the pile. In order to accomplish this, the lever 62 is actuated, whereupon fluid flows into the cylinder 45. The pistons 47 thereupon are extended, urging the longitudinal lifting arms 42 in a counter-clockwise direction. The position of the chain or flexible element 52 is as shown in Fig. 1 and the lifting frame 22 is therefore initially moved in a vertical direction to the position shown in Fig. 2. In this position the U-shaped link 54 has been moved upwardly until it engages the bolt 55. The flexible element 52 is now in a tensioned condition. A portion of the load has now been broken slightly loose from the pile, but it is still necessary to extricate the shovel from the pile. In order to accomplish this, it is, of course, necessary to drive the tractor rearwardly so that the shovel may be extricated. During this reverse operation of the tractor it is of course the intention that the major portion of the load, which has been broken loose, is retracted with the shovel.

To accomplish this, the operator desires to hook the load so that it will be removed with the shovel. He therefore, simultaneously with the rearward traction of the tractor, actuates the lever 62 so that the longitudinal lifting arms 42 are continued in their counter-clockwise rotation. As the arms 42 are thus moved the sprockets or sheaves 49 engage and rotate on the flexible elements 52. Since the flexible elements 52 are securely anchored at their lower ends by means of the bolts 55, rearward pivoting movement of the arms 42, against the flexible elements, causes the upper ends of the vertical members 23 to rotate in a counter-clockwise direction. The connection 43 of the lifting arm 42 to the vertical members 23 is spaced downwardly from the upper end. Thus as the lifting arms 42 are moved upwardly and rearwardly the distance between the shafts 50 and the pivotal connections 53 of the chain 52 is shortened and the upper ends of the vertical members are pivoted rearwardly. As these members are moved rearwardly, it is of course apparent that the lower ends of the vertical arms are moved upwardly in an arcuate path, thus raising the shovel. As indicated previously, it is desired that the shovel hooks a portion of the pile during rearward movement of the tractor. In view of the non-parallel arrangement of the link 58 with respect to the vertical members 23 the toe of the shovel is tilted upwardly within the pile as the lifting arms 42 are moved in a counter-clockwise direction. Thus, as shown in the dotted line position in Fig. 2 and as shown in Fig. 3, the vertical arms 23 are bodily pivoted with the lifting arms 42, whereby the toe of the shovel is simultaneously lifted upwardly. The effect and result of this upward tilting of the shovel is obvious.

As shown in Fig. 2, when the shovel is tilted in this manner in the pile the simultaneous rearward movement of the tractor thereupon causes extrication of the shovel with the shovel positively hooking the portion of the pile that has previously been broken loose. By this novel arrangement, therefore, a fully loaded shovel is obtained.

It can thus be seen that the novel linkage arrangement cooperating with the lifting frame 22 is effective to positively engage and break loose a portion from the pile. In this manner the loader may be utilized to engage and take out a portion of the lower end of the pile without the necessity of continually working from the top downwardly as is the case in the previously mentioned boom type loaders. With the novel loader shown the operator may attack the pile in the middle or at the bottom and remove a portion of the same with a minimum of effort since the novel linkage arrangement permits the shovel to be tilted within the pile simultaneously with the rearward movement of the tractor to therefore hook and remove a portion of the pile that is desired. The top of the pile then collapses from the undercutting action of the loader without the necessity of having the loader expend needless work thereon. This has not been possible with previous type loaders. It can be seen by the operation that the greatest initial stresses in breaking the pile loose are carried close to the front end of the tractor, therefore eliminating the cantilever action on the rear wheels which is so prevalent with the boom type of loaders.

In applicant's loader full traction is maintained on the rear wheels and rearward movement of the tractor can be accomplished with a fully loaded shovel.

It must be understood that only a preferred embodiment of the invention has been shown and that changes and modifications may be made therein which do not depart from the spirit of the invention as disclosed nor the scope thereof as defined in the appended claims.

What is claimed is:

1. A loading attachment for a tractor comprising a supporting structure mounted on the tractor; a shovel positioned forwardly of the tractor; a lifting frame, said frame including a pair of vertically extending members pivotally connected at their lower portions to the shovel; a horizontally extending lifting arm pivotally connected to the supporting structure; means pivotally connecting said lifting arm to said vertically extending members, said members having an upper portion extending upwardly beyond the point of connection of said lifting arm; a hydraulic ram supported on the tractor and connected to the lifting arm for moving the same; a vertical link pivotally connected to said shovel, said link being substantially coextensive with said vertical members and non-parallel with respect thereto; a horizontal strap pivotally connected to said vertically extending members and said supporting structure; a vertical strap connecting said horizontal strap and said lifting arm; said hydraulic ram being adapted to move said frame bodily vertically thereby moving said shovel vertically adjacent the front of said tractor; means for limiting the vertical movement of said lifting frame, said means including a flexible element having one end connected to the upper portion of the vertically extending members and the other end connected to the tractor, said flexible element being normally inoperative during the initial vertical movement of the lifting frame, and means on said lifting arm for engaging said flexible element thereby pivoting the upper portion of said vertically extending member rearwardly on said lifting arm, whereby said lifting frame is pivoted from a vertical downwardly extending position to an upwardly extending inclined position and said shovel is moved upwardly with its material engaging end tilted upwardly.

2. A loading attachment for a tractor comprising a support mounted on the tractor; a shovel positioned forwardly of the tractor; a lifting frame; said frame including a pair of vertical members pivotally connected to the shovel; a lifting arm pivotally connected to the support; means pivotally connecting said arm in spaced relation from the upper end of said vertical members; a link pivotally connected to said shovel; said link extending upwardly and rearwardly in diagonal relation with respect to said vertical members; means pivotally connecting said link to said support; a vertical strap pivotally connected to said diagonal link and pivotally connected to said lifting frame, a flexible element connected to the upper ends of said vertical members; means connecting said flexible element to the tractor; a roller on said lifting arm; said flexible element being trained about said roller; and an extensible means mounted on the tractor and connected to the lifting arm for moving the same whereby said roller engages said flexible element and the upper end of said lifting frame is tilted rearwardly on said lifting arm and the lower end of said lifting frame is moved upwardly above the tractor whereby said shovel is moved to a lifted position.

3. A loading attachment for a tractor comprising a supporting structure; a shovel positioned at one end of the tractor; a lifting frame; said frame including a pair of vertical members pivotally connected to the shovel; a lifting arm extending horizontally and pivotally connected to said tractor; means pivotally connecting said lifting arm to said vertical members spacedly from the upper end of the same; a link pivotally connected to said shovel; said link extending upwardly diagonally with respect to said vertical members; a horizontal strap pivotally connected to said link and to said supporting structure; a vertical strap pivotally connected to said diagonal link and pivotally connected to said lifting frame, a power unit connected to said lifting arm for moving the same; a flexible element connected to the upper end of said vertical member and to said supporting structure; means on said lifting arm engageable with said flexible element upon movement of said arm whereby said frame is pivoted in a counter-clockwise direction and said shovel is moved to a raised position.

4. A loading attachment for a tractor comprising a supporting structure connected to the tractor; a shovel positioned forwardly of the tractor; a lifting frame pivotally connected to said shovel; said lifting frame including vertically extending members; a substantially horizontal lifting arm pivotally connected to the supporting structure at one end; means pivotally connecting the other end of the lifting arm to said lifting frame at a point spaced from the upper ends of said vertically extending member; a link having its lower end pivotally connected to said shovel; said link extending upwardly and diagonally with respect to said vertically extending members; a horizontally extending strap pivotally connected to the upper end of said diagonally extending link; means pivotally connecting said horizontal strap to said supporting structure; a vertical strap pivotally connected to the upper end of said diagonal link; means pivotally connecting said vertical strap to said lifting frame; a flexible element connected adjacent the upper ends of said vertically extending members; means connecting said flexible element to said supporting structure; power means connected to said supporting structure and lifting arm for pivoting said arm whereby said lifting frame is initially moved bodily upwardly; and means on said lifting arm engaging said flexible element during continued movement of said arm whereby said flexible element is tensioned, the upper ends of the vertical members are moved rearwardly and the lower end of said vertical members and said shovel are moved upwardly and outwardly in an arcuate path.

5. A loading attachment for a tractor comprising a supporting structure connected to the tractor; a shovel positioned forwardly of the tractor; a lifting frame pivotally connected to said shovel; said lifting frame including vertically extending members; a substantially horizontal lifting arm pivotally connected to the supporting structure at one end; means pivotally connecting the other end of the lifting arm to said lifting frame at a point spaced from the upper ends of said vertically extending members; a link having its lower end pivotally connected to said shovel; said link extending upwardly and diagonally with respect to said vertically extending members; a horizontally extending strap pivotally connected to the upper end of said diagonally extending link; means pivotally connecting said horizontal strap to said supporting structure; a vertical strap pivotally connected to the upper end of said diagonal link; means pivotally connecting said vertical strap to said lifting arm; a flexible element having one end connected adjacent the upper ends of said vertically extending members; means connecting the other end of said flexible element to said supporting structure; power means connected to said supporting structure and lifting arm for pivoting said arm whereby said lifting frame is initially moved bodily upwardly; said flexible element being normally inoperative during the initial vertical movement of said lifting frame, and roller means on said lifting arm engaging said flexible element during continued movement of said arm whereby said flexible element is tensioned, the upper ends of the vertical members are moved rearwardly and the lower ends of said vertical members and said shovel are moved upwardly and outwardly in an arcuate path.

GORDON G. McNAMARA, Jr.

REFERENCES CITED

The following references are of record in the file of this patent:

UNITED STATES PATENTS

| Number | Name | Date |
| --- | --- | --- |
| 1,080,250 | Blick | Dec. 2, 1913 |
| 1,175,792 | Mickelsen | Mar. 14, 1916 |
| 2,441,070 | Hoover | May 4, 1948 |
| 2,449,212 | Fraga | Sept. 14, 1948 |
| 2,470,147 | Cramer | May 17, 1949 |